United States Patent
Matsunaga et al.

[15] 3,682,064
[45] Aug. 8, 1972

[54] APPARATUS FOR STEREOGRAPHICALLY PHOTOGRAPHING A SCENE

[72] Inventors: Kenji Matsunaga; Michio Horiuchi, both of Tokyo, Japan

[73] Assignee: Dai Nippon Insatsu Kabushiki Kaisha, Tokyo, Japan

[22] Filed: Oct. 24, 1969

[21] Appl. No.: 869,047

[30] Foreign Application Priority Data

Dec. 28, 1968 Japan..................44/860

[52] U.S. Cl..................................95/18 P
[51] Int. Cl...................................G03b 35/08
[58] Field of Search........................95/18 P

[56] References Cited

UNITED STATES PATENTS

| | | | |
|---|---|---|---|
| 3,016,812 | 1/1962 | Chaflain | 95/18 X |
| 3,173,348 | 3/1965 | Befinis | 273/186 X |
| 1,942,638 | 1/1934 | Draper | 95/18 P X |
| 3,187,339 | 6/1965 | Clay | 95/18 P X |
| 3,518,929 | 7/1970 | Glenn, Jr. | 95/18 P X |

*Primary Examiner*—Samuel S. Matthews
*Assistant Examiner*—Richard M. Sheer
*Attorney*—Wenderoth, Lind & Ponack

[57] ABSTRACT

This invention relates to a method and an apparatus for instantaneously photographing animated and inanimated scenes stereographically. The method is carried out by using apparatus comprising a plurality of cameras placed at diverse vantage points having their optical axes convergent upon the scene to be photographed. Electronic devices are used for setting the shutter speed for the shutter of each of said cameras, and electrical or mechanical devices are used for either synchronizing or delaying the starting time of the shutter of each of said cameras.

3 Claims, 5 Drawing Figures

PATENTED AUG 8 1972 3,682,064

KENJI MATSUNAGA and
MICHIO HORIUCHI,
INVENTORS

BY Wendereth, Lind & Ponack
ATTORNEYS

APPARATUS FOR STEREOGRAPHICALLY PHOTOGRAPHING A SCENE

The invention relates to a method of and apparatus for instantaneously stereographically photographing both animated an inanimated scenes. More particularly, this invention comprises a plurality of diversely placed cameras focusing on a common scene, electronic means for setting the shutter speed of the shutter of each of said cameras, and electrical or mechanical means for synchronizing the starting time of the shutter of each of said cameras. Further, this invention comprises electrical or mechanical means for also delaying the starting time of the shutter of each of said cameras, and the novel method may be effected by using either the former or the latter apparatus as mentioned above.

There has been proposed in the art a method for photographing stereographically by moving a single lens camera or the subject of interest being photographed, or by using a multiple lens camera. The method using the multiple lens camera enables taking a photograph of a moving subject, and hence the method is referred to as an instantaneous method for photographing stereographically.

An object of this invention is to provide an improved method of and apparatus for instantaneously photographing stereographically both animated or inanimated subjects.

A further object of this invention is to provide an apparatus for effecting the aforementioned photography by delaying the starting time of the shutter of each of the cameras.

According to the method and by using the apparatus of this invention, each of the shutters of a plurality of cameras can by synchronously started with a satisfactory degree of accuracy or can be operated by delaying the starting time with satisfactory accuracy, and the shutter speed also can be adjusted with the satisfactory accuracy.

This invention is illustrated by referring to the accompanying drawings, in which.

Figure 3:
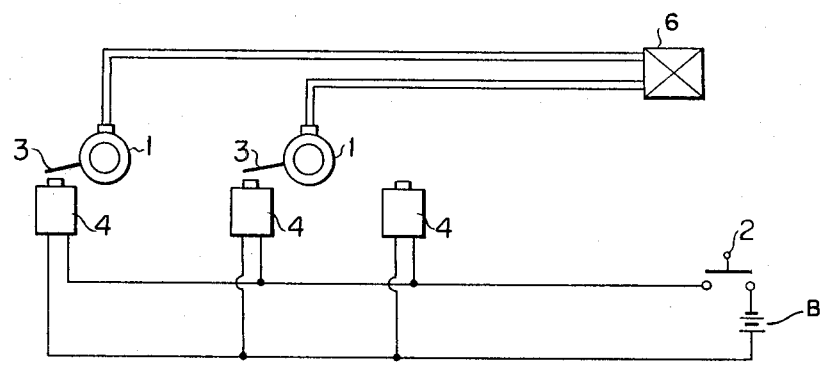
Figure 4:
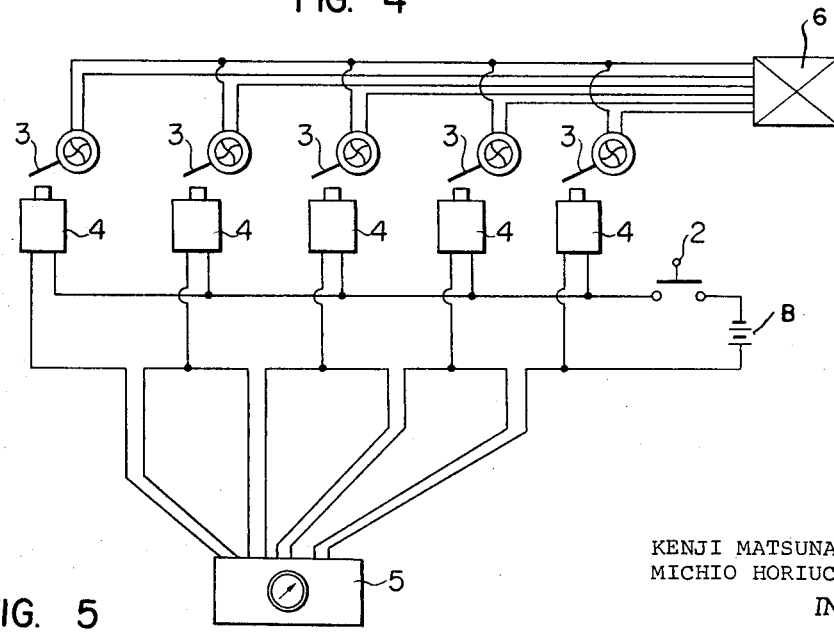
Figure 5:
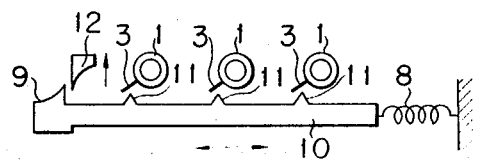

FIG. 3 diagrammatically shows an apparatus for instantaneously photographing stereographically in accordance with this invention;

FIG. 4 diagrammatically shows an apparatus for photographing either an animated or inanimated subject stereographically in accordance with this invention; and FIG. 5 shows a modification of the shutter starting means as shown in FIGS. 3 and 4.

Figure 1:
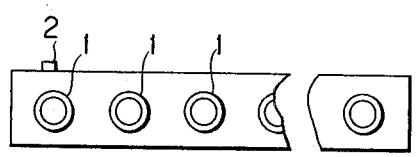
FIG. 1 shows a front elevational view of a plurality of longitudinally spaced cameras used in this invention for photographing stereographically.

By referring to FIG. 1, it shows the front view of a plurality of cameras, for example, from two to 20 cameras, each having the same standard lens and the diaphragms as indicated by the numeral 1, and they can be spaced in a linear or arcuate state at the desired intervals. The part designated by numeral 2 is a shutter button or switch, and the numeral 3 denotes a shutter actuating lever. The numeral 4 schematically denotes a solenoid and the numeral 6 an electronic circuit for setting the shutter speed. The electronic circuit 6 produces a pulse signal and amplifies the pulse signal for controlling the starting time of all the shutters. When the shutter button 2 is pressed, the solenoid 4 receives electric current from a power source such as a battery B, and the shutter release lever 3 acts for instantaneously photographing a subject of interest in the stereographic form.

Figure 2:
FIG. 2 shows a plan view of the cameras as shown in FIG. 1.

FIG. 4 shows the apparatus for photographing, as described above, using the cameras as shown in FIGS. 1 and 2. In FIG. 4 the same numerals indicate the same elements as in FIG. 3, and the numeral 5 schematically denotes the conventional electric time limit relay. When the shutter button 2 is pressed, the electric time limit relay 5 acts for starting each of the shutters by delaying the starting time of the respective shutters at a time interval of 1/100 – 1 second, respectively, to thereby effect the desired type of stereographic photograph. It is to be understood that the delaying of the starting time of the shutters may be varied, and also that the respective time intervals for starting the shutters may not be equal. The solenoid 4 for electrically effecting actuation of the shutter lever 3 can be replaced with a mechanical device, as shown in FIG. 5. In FIG. 5, the numeral 8 designates a spring, the numeral 9 designates a large hook, the numeral 10 a rigid bar, the numeral 11 a small hook, and the numeral 12 designates a stopper for stopping the rigid bar 10. The rigid bar is provided with a series of small hooks 11 corresponding to the positions of the respective shutter levers 3. When the shutter button 2, as indicated in FIGS. 1 and 2, is pressed, the large hook 9 of the rigid bar 10 is slipped from the stopper 12 and then the rigid bar 10 is moved at a considerable speed by the action of the spring 8. When the respective shutter levers 3 are engaged by the small hooks 11, the shutters open synchronously.

If desired, the small hook 11 on the rigid bar 10 can be non-uniformly progressively spaced to the left or the right direction on the bar 10 to effect progressive or unequal delaying of the starting time of the shutters. Also, the rigid bar 10 can be designed so that it can be rotated to effect the desired operation.

We claim:

1. Apparatus for instantaneously effecting stereographic photographing, comprising in combination a plurality of shutter-operated cameras arranged in a predetermined uniformly sequential position focused upon and relative to a subject to be photographed; electronic means connected to and for setting the shutters of the cameras for a predetermined speed electronically for each of the cameras; said electronic means forming a part of electrically related circuit means forming part of said apparatus; said electrical circuit means further including means operatively connectable with and for selectively effecting electrical synchronizing or delaying of the starting times of the camera shutters.

2. Apparatus as defined in claim 1 wherein the electronic means for setting the shutter speeds includes an electronic circuit means connected to and capable of both generating a pulse signal and also amplifying said pulse signal in a predetermined timed manner to control said shutters; said electrical circuit means comprising further a plurality of electrical solenoid devices corresponding in number to the number of cameras and respectively disposed operatively adjacent the respective camera shutters, and arranged in parallel in said electric circuit and connected by shutter related switch means to a source of electrical power forming part of said circuit means, whereupon closing of said shutter related switch means simultaneously electrically energizes said solenoid devices to in turn simultaneously activate the electronically set shutters of the respective cameras to effect said desired photographing.

3. Apparatus as defined in claim 1 wherein the electronic means for setting the shutter speeds includes electronic circuit means connected to and capable of both generating a pulse signal and also amplifying said pulse signal in a predetermined timed manner to control said shutters; said electrical circuit means further comprising a plurality of electrical solenoid devices corresponding in number to the number of cameras and respectively disposed operatively adjacent the shutters thereof; said solenoid devices arranged in said electrical circuit in operative relationship with electrical time delay relay means settable to effect uniformly progressive time delay operation of said solenoid means, and also in operative relation with a source of electrical power and interposed switch means, whereupon closing of said switch means electrically energizes said solenoid means in a non-synchronous but progressively uniformly time-delayed manner to thus activate the electronically set shutters to effect the desired stereographic photographing.

* * * * *